United States Patent
Aktas

(10) Patent No.: US 11,904,736 B2
(45) Date of Patent: Feb. 20, 2024

(54) POSITIONING MEMBER FOR SEATING ASSEMBLY

(71) Applicant: Ford Global Technologies, LLC, Dearborn, MI (US)

(72) Inventor: Macit Aktas, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 545 days.

(21) Appl. No.: 17/211,694

(22) Filed: Mar. 24, 2021

(65) Prior Publication Data

US 2022/0305963 A1  Sep. 29, 2022

(51) Int. Cl.
*B60N 2/12* (2006.01)
*B60N 2/14* (2006.01)

(52) U.S. Cl.
CPC  *B60N 2/12* (2013.01); *B60N 2/14* (2013.01)

(58) Field of Classification Search
CPC .......... B60N 2/0292; B60N 2/04; B60N 2/06; B60N 2/12; B60N 2/14; B60N 2002/0204; B60N 2002/0216; B60N 2002/247
USPC ................................... 296/65, 65.05, 65.13
See application file for complete search history.

(56) References Cited

U.S. PATENT DOCUMENTS

| 4,884,843 | A | 12/1989 | DeRees |
| 8,016,354 | B2 * | 9/2011 | Veluswamy ........... B60N 2/305 297/320 |
| 8,496,294 | B2 | 7/2013 | Holdampf et al. |
| 8,517,328 | B2 | 8/2013 | Wieclawski et al. |
| 9,827,879 | B2 | 11/2017 | Fujita et al. |
| 9,868,369 | B1 | 1/2018 | Aktas |
| 10,058,178 | B2 | 8/2018 | Sasaki et al. |
| 10,183,593 | B2 | 1/2019 | Wolf et al. |
| 10,239,423 | B2 | 3/2019 | Aktas |
| 11,065,988 | B1 * | 7/2021 | Rdzanek .................. B60N 2/12 |
| 11,260,776 | B1 * | 3/2022 | Aktas ................. B60N 2/02246 |
| 11,407,332 | B1 * | 8/2022 | Aktas ..................... B60N 2/123 |
| 2006/0131946 | A1 | 6/2006 | Andrigo et al. |

(Continued)

FOREIGN PATENT DOCUMENTS

DE  102019133959 A1 *  3/2021 ............... B60N 2/12
EP  2565070 B1  9/2020

OTHER PUBLICATIONS

Commonly assigned co-pending U.S. Appl. No. 17/174,393, filed Feb. 12, 2021, including filing receipt, application and drawings.

(Continued)

*Primary Examiner* — Jason S Daniels
(74) *Attorney, Agent, or Firm* — Vichit Chea; Price Heneveld LLP

(57) ABSTRACT

A vehicle seating assembly includes a track assembly disposed on a vehicle floor. The track assembly includes a rail slidably disposed in a track and a positioning bracket fixedly coupled to the track. A lift mechanism is coupled to a pivot bracket disposed on the rail and is configured to rotate the seat frame between sitting and standing positions. A lever assembly is rotatably coupled to the lift mechanism, rotatable about a seat axis of rotation, and movable along the positioning bracket as the rail slides in the track. A release mechanism is operably coupled to the lift mechanism and the track assembly. The release mechanism may fix the rail relative to the track or release the rail from the track.

20 Claims, 13 Drawing Sheets

(56) References Cited

U.S. PATENT DOCUMENTS

2009/0230744 A1     9/2009   Szybisty et al.
2013/0292982 A1*   11/2013   Radermacher ........... B60N 2/12
                                                                              297/334

OTHER PUBLICATIONS

Commonly assigned co-pending U.S. Appl. No. 17/174,396, filed Feb. 12, 2021, including filing receipt, application and drawings.
Commonly assigned co-pending U.S. Appl. No. 17/174,408, filed Feb. 12, 2021, including filing receipt, application and drawings.
Commonly assigned co-pending U.S. Appl. No. 17/071,662, filed Oct. 15, 2020, including filing receipt, application and drawings.
Commonly assigned co-pending U.S. Appl. No. 16/704,081, filed Dec. 5, 2019, including filing receipt, application and drawings.
Commonly assigned co-pending U.S. Appl. No. 16/704,118, filed Dec. 5, 2019, including filing receipt, application and drawings.
Commonly assigned co-pending U.S. Appl. No. 16/704,141, filed Dec. 5, 2019, including filing receipt, application and drawings.

* cited by examiner

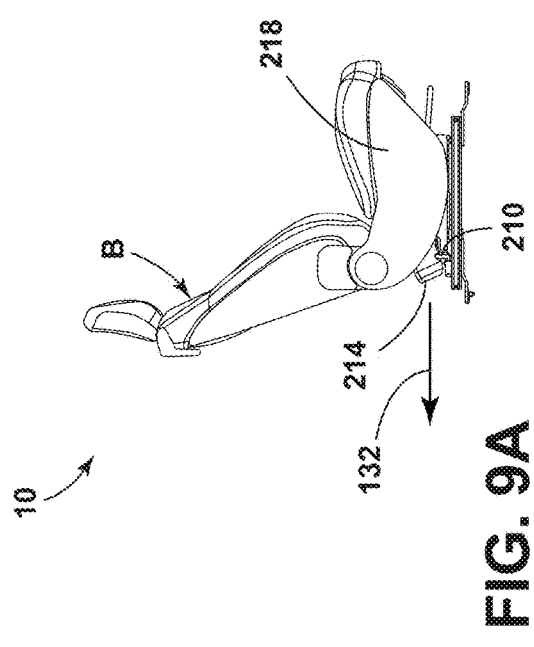
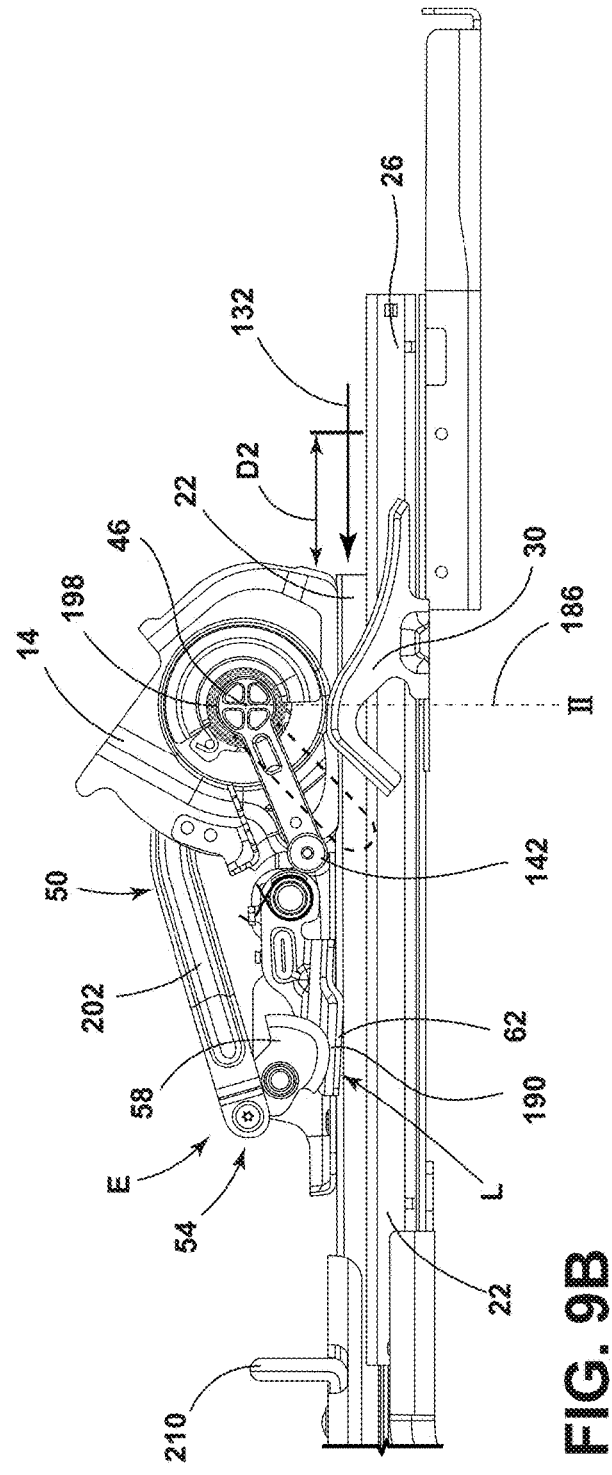

POSITIONING MEMBER FOR SEATING ASSEMBLY

FIELD OF THE DISCLOSURE

The present disclosure generally relates to a vehicle seating assembly, and more specifically to a vehicle seating assembly that can be arranged in various positions.

BACKGROUND OF THE DISCLOSURE

A vehicle seating assembly may have features that may allow the vehicle seating assembly to be arranged in various positions at various locations along a vehicle floor to accommodate user preferences.

SUMMARY OF THE DISCLOSURE

According to a first aspect of the present disclosure, a vehicle seating assembly is provided. The vehicle seating assembly includes a track assembly disposed on a vehicle floor. The track assembly includes a rail slidably disposed in a track and a positioning bracket fixedly coupled to the track. The vehicle seating assembly further includes a seat frame and a pivot bracket. The pivot bracket is disposed at the front of the seat frame, coupled to the rail, and defines a seat axis of rotation disposed laterally along the seat frame. The vehicle seating assembly also includes a lift mechanism coupled to the pivot bracket and configured to rotate the seat frame about the seat axis of rotation and between a sitting position and a standing position. The vehicle seating assembly has a lever assembly rotatably coupled to the lift mechanism, rotatable about the seat axis of rotation, and movable along the positioning bracket as the rail slides in the track. The vehicle seating assembly includes a release mechanism operably coupled to the lift mechanism and the track assembly and positionable in a locked position to fix the rail relative to the track or an unlocked position to release the rail from the track.

Embodiments of the first aspect of the present disclosure can include any one or a combination of the following features:

- the release mechanism includes a crank assembly rotatably coupled to the lift mechanism;
- the release mechanism includes a cam assembly rotatably coupled to the crank assembly;
- the cam assembly is positionable in a locked position to fix the rail to the track;
- the cam assembly is positionable in an unlocked position to release the rail from the track;
- the positioning bracket includes two sloped surfaces;
- the rail and the seat frame slide along a track from a first location along the track in which the seating assembly is in the standing position and the cam assembly is in the unlocked position to a second location along the track in which the seating assembly is in the sitting position and the cam assembly is in the locked position;
- an apex of the positioning bracket is disposed between the first location along the track and the second location along the track;
- the lever assembly includes a roller movable over the apex of the positioning bracket as the seat frame slides from the first location along the track to the second location along the track;
- the lever assembly rotates a predetermined angle about the seat axis of rotation as the roller moves from the first location along the track to the second location along the track;
- the predetermined angle is in an approximate range of approximately 13.0 degrees to approximately 52.0 degrees;
- the predetermined angle is approximately 26.0 degrees; and/or
- the positioning bracket defines a travel path.

According to a second aspect of the present disclosure, a vehicle seating assembly is provided. The vehicle seating assembly includes a seating assembly, a lift mechanism for moving the seating assembly between the sitting position and the standing position, and a pivotable coupling between the lift mechanism and the seating assembly. The pivotal coupling includes a seat axis of rotation disposed through the pivoting coupling. The vehicle seating assembly further includes a track assembly disposed on a vehicle floor that includes a stationary member and a movable member. The vehicle seating assembly further includes a positioning member disposed adjacent to the track assembly and proximate the vehicle floor. The vehicle seating assembly also includes a lever assembly coupled to the lift mechanism, rotatable about the seat axis of rotation, and movable from a first location to a second location as the movable member moves relative to the stationary member, wherein in the first location the movable member is slidable relative to the stationary member, and wherein in the second location the movable member is locked relative to the stationary member.

Embodiments of the second aspect of the present disclosure can include any one or a combination of the following features:

- the positioning member includes a bracket having an apex, wherein a distal end of the lever assembly is on a first side of the apex if the lever assembly is in the first location, wherein the distal end of the lever assembly is on a second side of the apex if the lever assembly is in the second location, and wherein the distal end of the lever assembly is on the apex if the lever assembly is in an intermediate location between the first location and the second location;
- the lever assembly includes a lever and a roller;
- the positioning member includes a positioning bracket having a base portion transverse to a guide portion;
- the base portion is disposed below the stationary member; and/or
- an actuation force disposed on the seating assembly to move the seating assembly from the first location to the second location varies.

According to a third aspect of the present disclosure, a vehicle seating assembly is provided. The vehicle seating assembly includes a seating assembly slidable along a track from a first location to a second location, wherein in the first location the seating assembly is in a standing position and wherein in the second location the seating assembly is in a sitting position. The vehicle seating assembly includes a positioning member disposed adjacent to the track. The positioning member includes a first sloped surface and a second sloped surface. The vehicle seating assembly further includes a lever assembly rotatably coupled to the seating assembly that includes an arm portion movable along the first sloped surface and the second sloped surface as the seating assembly moves from the first location to the second location.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 9A is a right side elevational view of a seating assembly in a sitting position disposed at a second location of a track assembly, according to an aspect of the disclosure;

FIG. 9B is a right side elevational view of a track assembly, a positioning member, and a lever assembly disposed at a second location of a track assembly, according to an aspect of the disclosure;

DETAILED DESCRIPTION

With reference to the vehicle seating assemblies described below and shown in the attached figures, a vehicle seating assembly 10 may be described from the vantage point of an occupant seated in the seating assembly 10. The side of a seating assembly 10 disposed on a right side of a seated occupant may be referred to as a right side of the seating assembly 10. The side of the seating assembly 10 disposed on a left side of a seated occupant may be referred to as a left side of the seating assembly 10.

Figure 1:
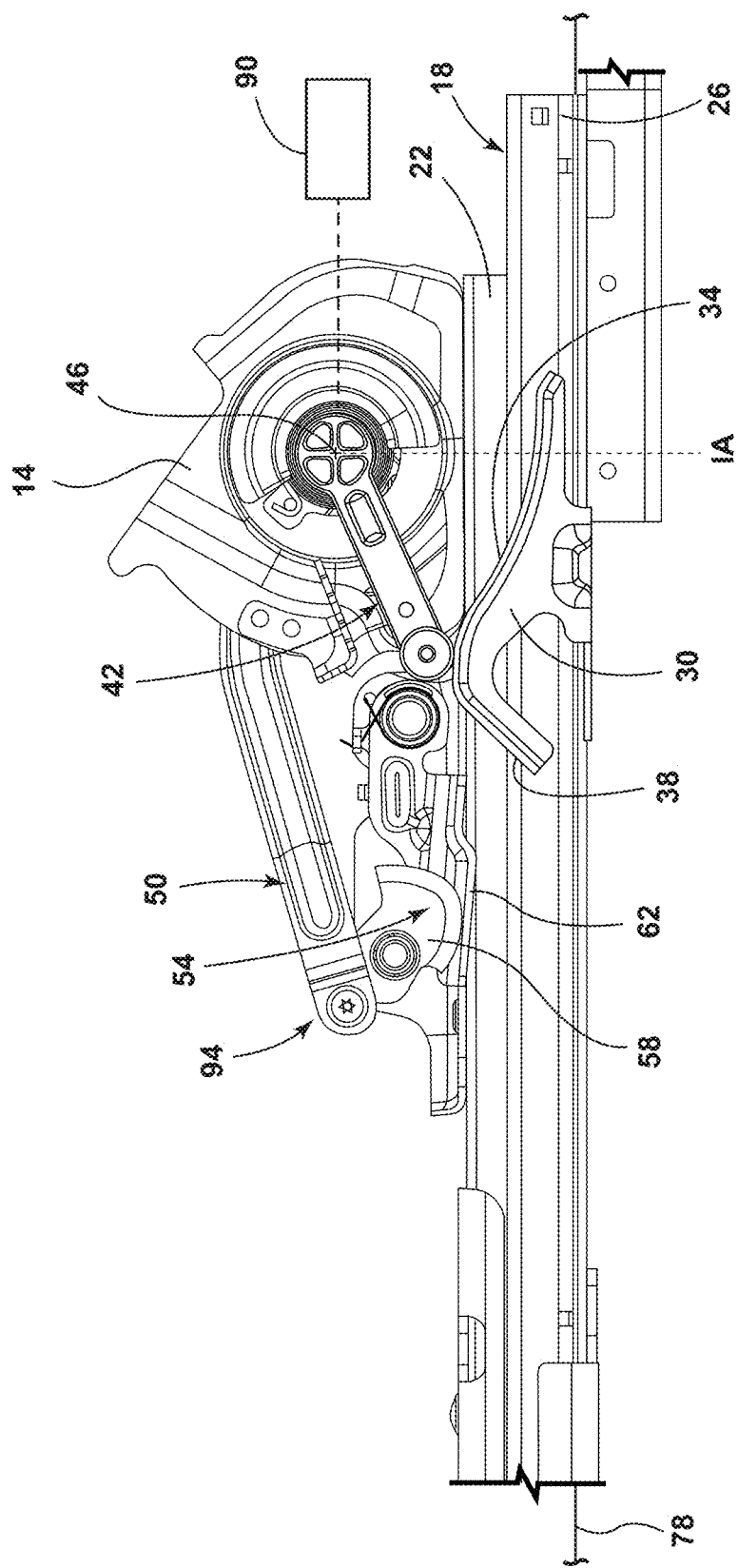
FIG. 1 is a right side elevational view of a track assembly, a positioning member, and a lever assembly, according to an aspect of the disclosure.

Referring to FIG. 1, a pivot bracket 14 of a seating assembly 10 is shown disposed on a track assembly 18. The track assembly 18 may include a rail 22 and a track 26. The rail 22 may slide in the track 26. A positioning bracket 30 may be adjacent to the track 26. The positioning bracket 30 may be in a generally fixed location relative to the track 26 and the floor 78. The track 26 may be in a generally fixed location relative to the floor 78. The track 26 may be secured to the vehicle frame. The positioning bracket 30 may include a first sloped surface 34 and a second sloped surface 38. A lever assembly 42 may be rotationally coupled to a seat axis of rotation 46 defined by the pivot bracket 14. A crank assembly 50 may be rotationally coupled to the pivot bracket 14. The crank assembly 50 may extend away from the pivot bracket 14. A cam assembly 54 may be coupled to the crank assembly 50. The cam assembly 54 may include a cam 58 disposed on an actuation plate 62. The cam 58 may exert different pressures on the actuation plate 62 to secure the rail 22 to the track 26 or to release the rail 22 from the track 26. The seat axis of rotation 46 is shown in an intermediate location IA relative to the track 26 in FIG. 1.

Figure 2A:
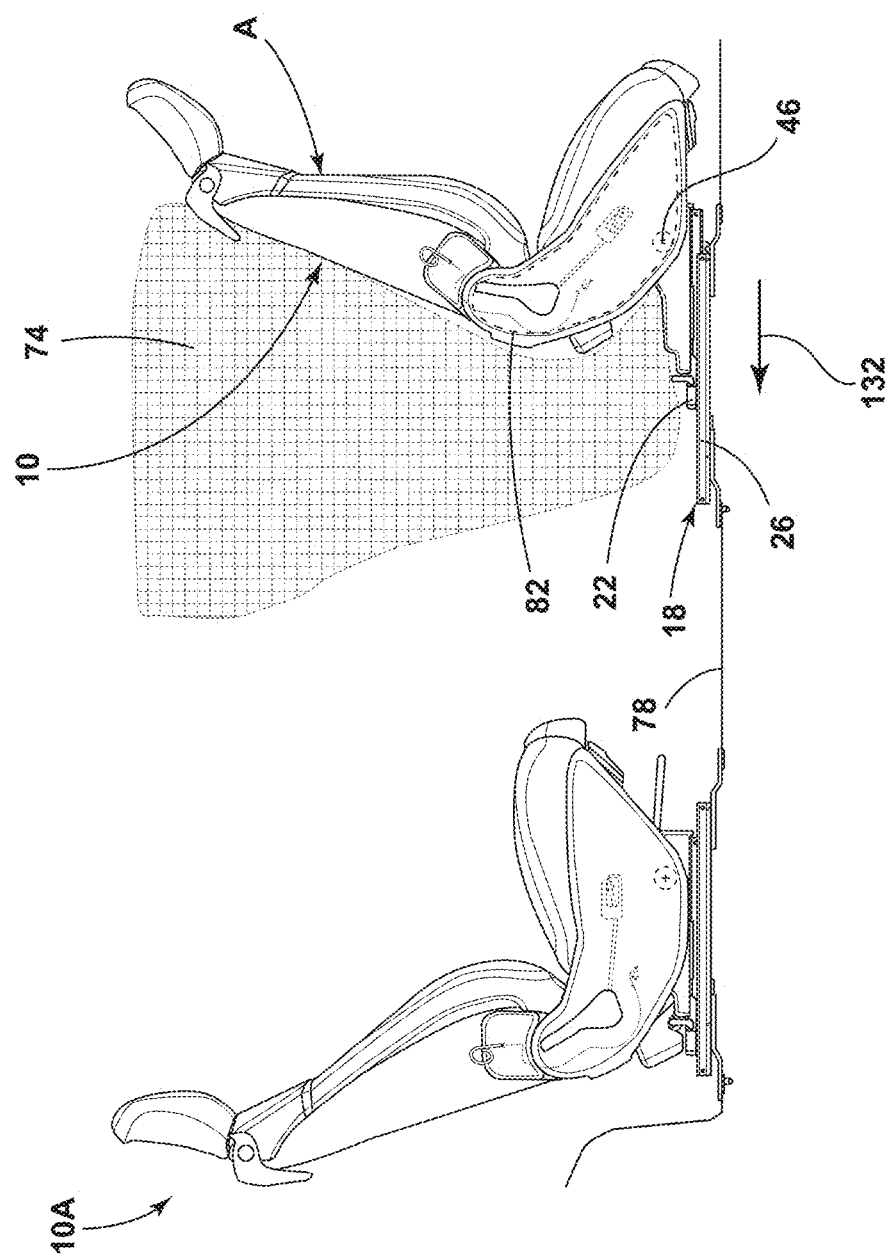
FIGS. 2A-2C are right side elevational schematic views of a seating assembly moving along a track and moving from a standing position to a sitting position, according to an aspect of the disclosure.
Figure 2B:
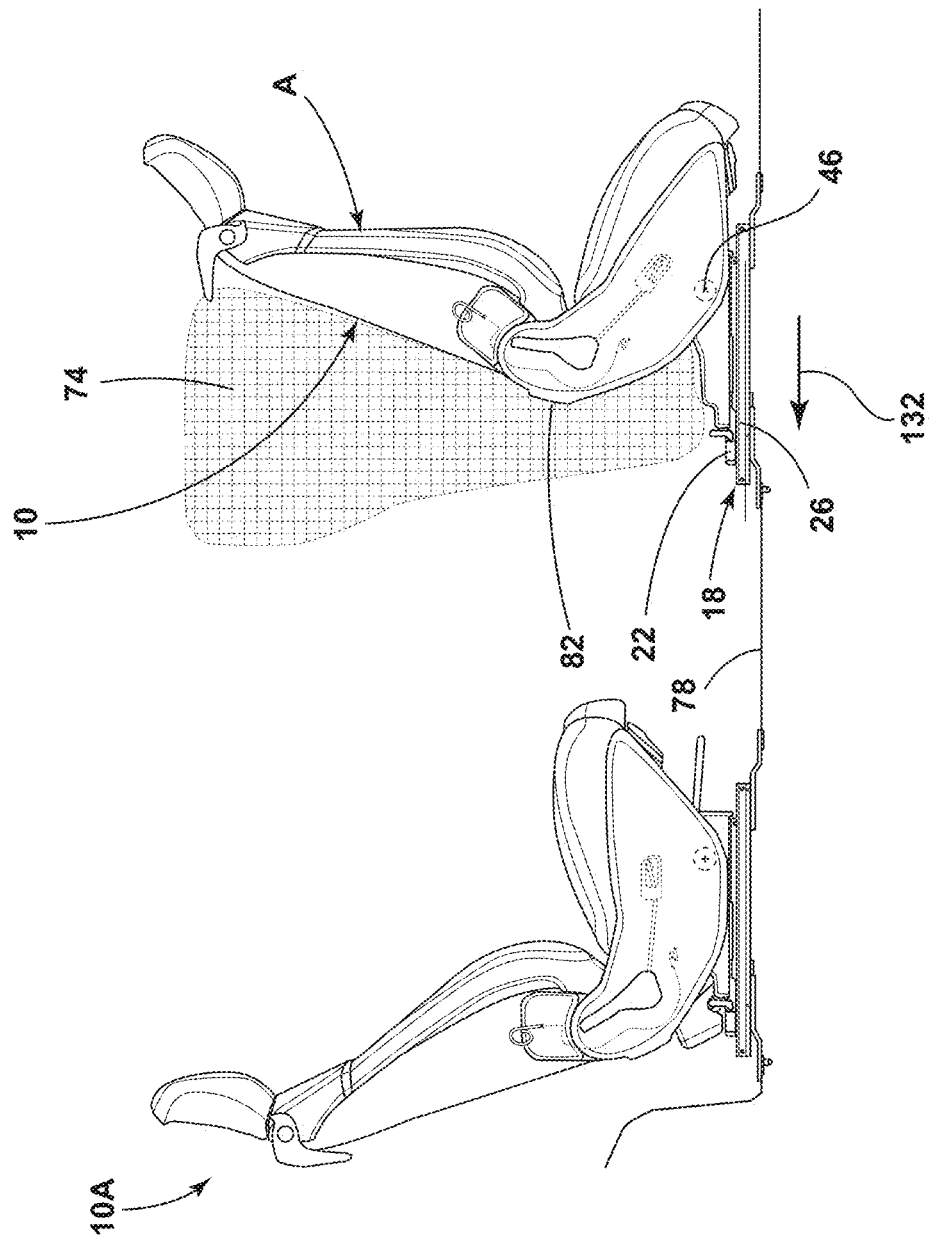
Figure 2C:
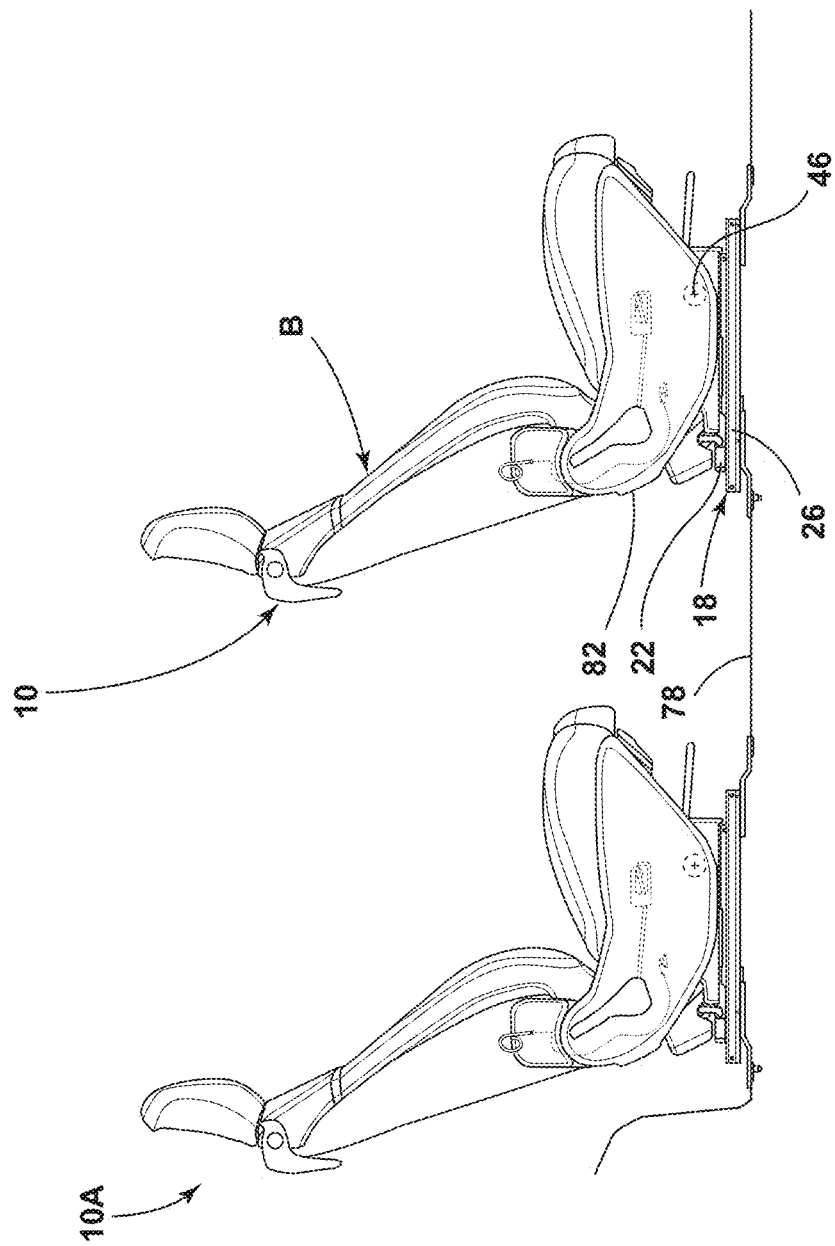

Referring to FIGS. 2A-2C, a seating assembly 10 is shown disposed on a track assembly 18. The track assembly 18 may include a rail 22 and a track 26. The seating assembly 10 may be attached to the rail 22. The rail 22 may be slidable in a track 26. The seating assembly 10 may be disposed in various locations along a track 26 to provide for convenient access space 74 for reaching a rear seating assembly 10A. A rear seating assembly 10A may be disposed behind the seating assembly 10. FIG. 2A shows a seating assembly 10 in the standing position A and with an access space 74. A seat frame 82 may be rotatable about the seat axis of rotation 46. The seating assembly 10 and the rail 22 may be slidable along the track 26 in the direction shown by arrow 132. FIG. 2B shows the seating assembly 10 in a standing position A and an access space 74. FIG. 2C shows the seating assembly 10 in a sitting position B and positioned for use by a seated occupant during travel. In the position of the seating assembly 10 shown in FIG. 2C, the seating assembly 10 and the rail 22 are typically fixedly coupled to the track 26, and fore and aft movement of the seating assembly 10 along the vehicle floor 78 is typically negligible.

Referring to FIGS. 1-14, a vehicle seating assembly 10 includes a track assembly 18 disposed on a vehicle floor 78. A rail 22 is slidably disposed in a track 26. A positioning bracket 30 is fixedly coupled to the track 26. The vehicle seating assembly 10 includes a seat frame 82 and a pivot bracket 14 disposed at the front of the seat frame 82, coupled to the rail 22, and defining a seat axis of rotation 46 disposed laterally along the seat frame 82. The vehicle seating assembly 10 also includes a lift mechanism 90 coupled to the pivot bracket 14 and configured to rotate the seat frame 82 about the seat axis of rotation 46 between the sitting position B and the standing position A. The vehicle seating assembly 10 includes a lever assembly 42 rotatably coupled to the lift mechanism 90, rotatable about the seat axis of rotation 46, and movable along the positioning bracket 30 as the rail 22 slides in the track 26. The vehicle seating assembly 10 also includes a release mechanism 94 (for example, crank assembly 50 and cam assembly 54) operably coupled to the lift mechanism 90 and the track assembly 18 and positionable in a locked position E to fix the rail 22 relative to the track 26 or an unlocked position F to release the rail 22 from the track 26.

With reference to FIGS. 1 and 12-14, the lift mechanism 90 may include a mechanical arrangement of parts for moving the seating assembly between a sitting position and a standing position. In one example, the lift mechanism may include a gear assembly. The gear assembly may include a toothed portion disposed on the pivot bracket and a pinion gear with a toothed portion. The pinion gear with the toothed portion may be fixed to the seat frame. The toothed portion of the pinion gear may rotate along the toothed portion of the sector gear to move the seating assembly from the sitting position to the standing position and intermediary positions between the sitting position and the standing position.

Referring again to FIGS. 1 and 12-14, in another example, the lift mechanism 90 may include a retention member that may be in an engaged position if the seating assembly is in the sitting position or if the seating assembly is in the standing position. The retention member may be in a disengaged position if the seating assembly is moving between the sitting position and the standing position. The lift mechanism 90 may be activated by manual actuation or powered actuation. The lift mechanism 90 may move the seating assembly 10 between the sitting position B and the standing position A by rotating the seating assembly 10 about the seat axis of rotation 46.

With continuing reference to FIGS. 1 and 12-14, the release mechanism may include a crank assembly 50 rotatably coupled to the lift mechanism 90 and the cam assembly 54. The cam assembly 54 may be positioned in a locked position E to fix the rail 22 to the track 26. The cam assembly 54 may be positioned in an unlocked position F to release the rail 22 from the track 26.

Figure 4:
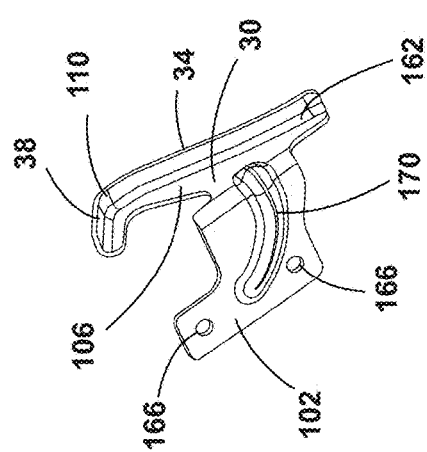
FIG. 4 is a perspective view of the positioning member, according to an aspect of the disclosure.
Figure 5:
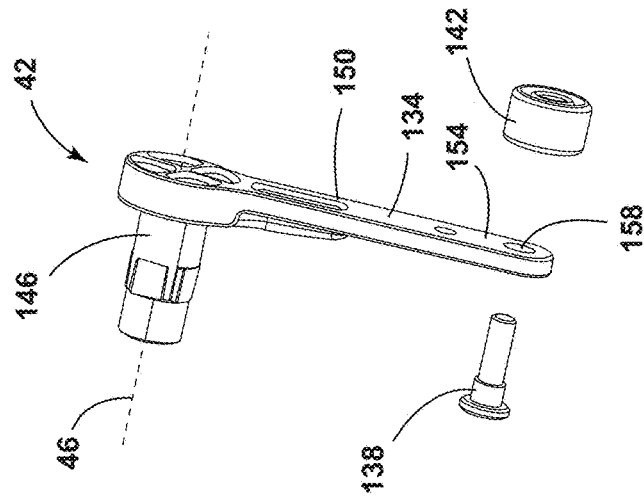
FIG. 5 is an assembly view of the lever assembly, according to an aspect of the disclosure.
Figure 3:
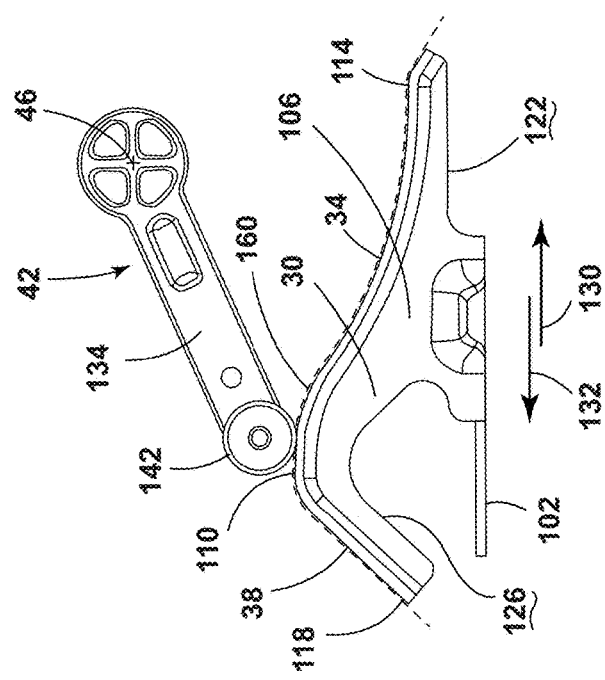
FIG. 3 is a right side elevational view of the positioning member and the lever assembly, according to an aspect of the disclosure.

Referring now to FIGS. 3-5, the positioning bracket 30 and the lever assembly 42 are shown. The positioning bracket 30 may include a base portion 102 and a guide portion 106. The guide portion 106 may be transverse to the base portion 102. The positioning bracket 30 may include an apex 110. The positioning bracket 30 may include a first sloped portion 34 and a second sloped portion 38. The guide portion 106 of the positioning bracket 30 may include a first arm 114 and a second arm 118. The first arm 114 may have a substantially straight lower surface 122. The second arm 118 may have a bent lower surface 126. The lever assembly 42 may be moved in two directions relative to the track 26. As the rail 22 that the pivot bracket 14 is coupled to moves along the track 26 to create access space 74 behind the seating assembly 10, the lever assembly 42 may move in a first direction shown by arrow 130. As the rail 22 that the pivot bracket 14 is coupled to moves along the track 26 to return the seating assembly 10 to a sitting position B, the lever assembly 42 may move in a second direction shown by arrow 132.

With continuing reference to FIGS. 3-5, the lever assembly 42 may move along a travel path 160 disposed along the top of the positioning bracket 30. The lever assembly 42 may include a lever 134, a fastener 138, and a roller 142. The lever 134 may include an axial portion 146 and an arm portion 150. The axial portion 146 may be disposed along the seat axis of rotation 46. The arm portion 150 may be transverse to and may extend away from the axial portion 146. The roller 142 and the fastener 138 may be coupled to the distal end 154 of the arm portion 150. The fastener 138 may extend through a hole 158 in the arm portion 150 and may be secured to the roller 142. The roller 142 may rotate about the fastener 138 as the roller 142 moves along the travel path 160 disposed on the positioning bracket 30. The roller 142 may include a metal, a composite, or another material. The roller 142 may be self-lubricating. In various aspects of the disclosure, the travel path 160 may include a recess 162 for receiving the roller 142. The base portion 102 of the positioning bracket 30 may include two apertures 166 for receiving fasteners for mounting the positioning bracket 30 to a vehicle frame and/or a vehicle floor 78. A ridge 170 may extend into the base portion 102 and the guide portion 106 of the positioning bracket 30 to strengthen the positioning bracket 30. The positioning bracket 30 may be made of steel, a composite, or another material.

Figure 6:
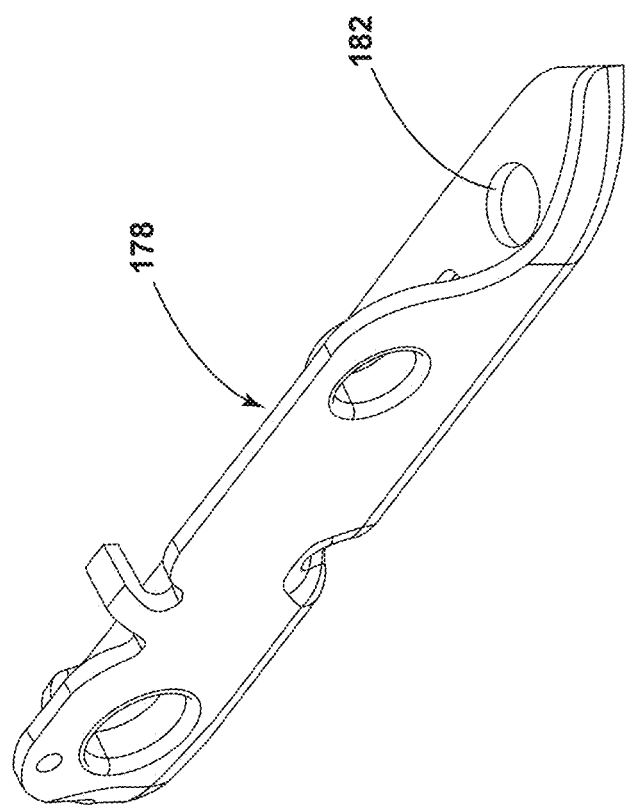
FIG. 6 is a perspective view of a track pivot bracket, according to an aspect of the disclosure.

Referring to FIG. 6, a track bracket 178 may be positioned on the track 26. The track bracket 178 may be secured to the rail 22 by fasteners that may extend through apertures 182 in the track bracket 178.

Figure 7A:
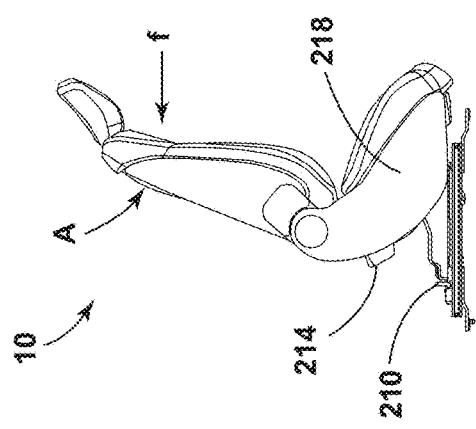
FIG. 7A is a right side elevational view of a seating assembly in a standing position disposed at a first location of a track assembly, according to an aspect of the disclosure.
Figure 7B:
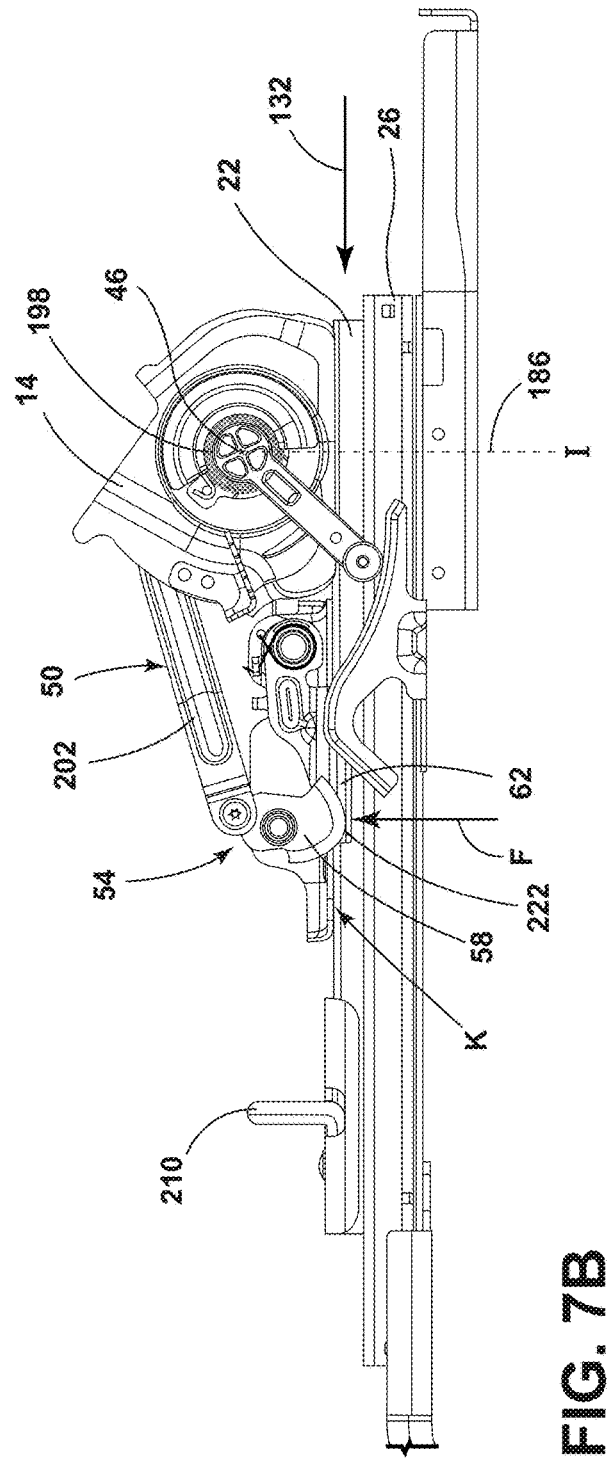
FIG. 7B is a right side elevational view of a track assembly, a positioning member, and a lever assembly disposed at a first location of the track assembly, according to an aspect of the disclosure.
Figure 14:
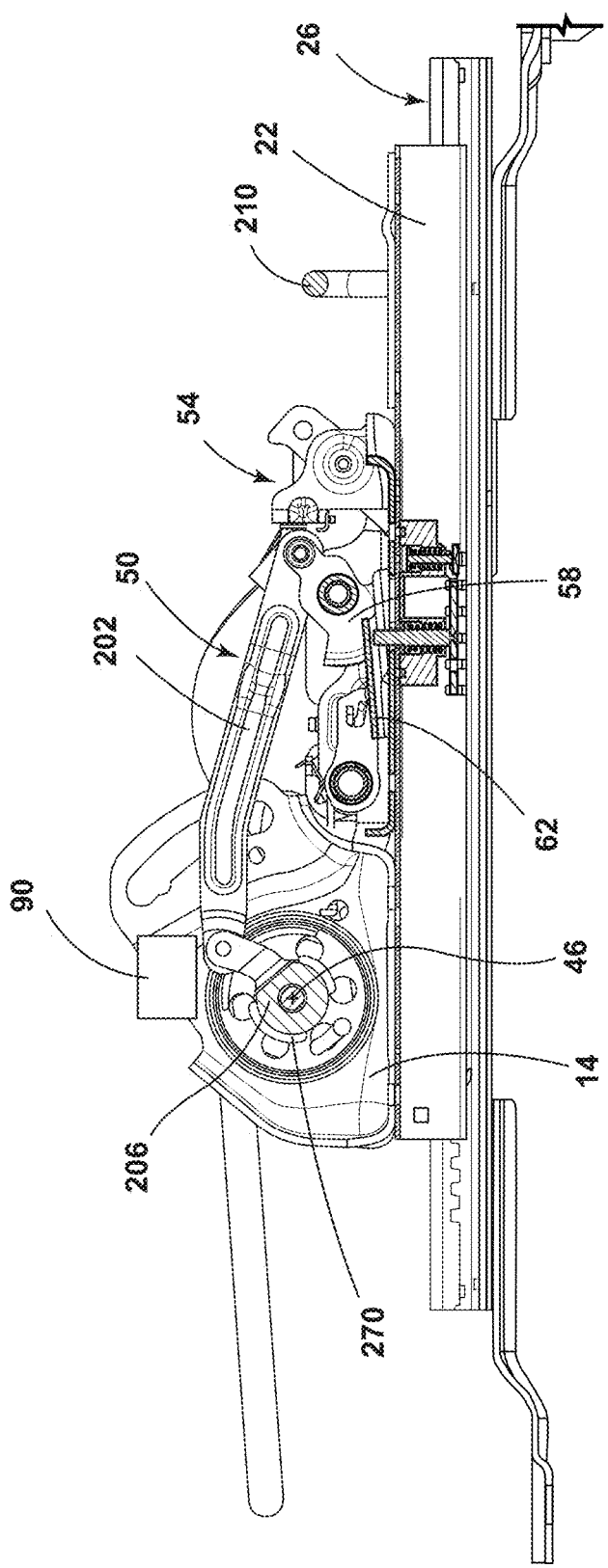
FIG. 14 is a left side elevational view of portions of a seating assembly frame disposed on a track assembly with the cam assembly in the locked position, and the actuation plate in the initial depressed position, according to an aspect of the disclosure.

Referring now to FIGS. 7A and 7B, the seating assembly 10 is shown in the standing position A and in the first location I relative to the track 26. In the example shown, the first location I is defined by a line 186 extending through the seat axis of rotation 46 and disposed transverse to the track 26. The pivot bracket 14 may be secured to the rail 22 with fasteners. Arrow 132 depicts the direction in which the rail 22 will move with the seating assembly 10 from the first location I (FIGS. 7A and 7B) to the intermediate location IA (FIGS. 8A and 8B) and to the second location II (FIGS. 9A and 9B). A force f may be exerted on the seating assembly 10 to move the seating assembly 10 form the first location I to the intermediate location IA and the second location II. The cam assembly 54 is shown in the unlocked position F. When the cam assembly 54 is in the unlocked position F, a concentric profile 222 of the cam 58 exerts a downward pressure on the actuation plate 62 to place the actuation plate 62 in the final depressed position K, thereby allowing the rail 22 to slide in the track 26. The rail 22 and the seat frame 82 slide along a track 26 from a first location I along the track 26 to a second location II along the track 26. In the first location I along the track 26, the seating assembly 10 is in the standing position A and the cam assembly 54 is in the unlocked position F. In the second location II along the track 26, the seating assembly 10 is in the sitting position B and the cam assembly 54 is in the locked position E. (FIGS. 9A, 9B.) The crank assembly 50 operably couples the cam assembly 54 to the pivotable coupling 198. The crank assembly 50 includes a linkage 202 and a disk adapter bracket 206. (FIGS. 14, 16.) A striker 210 for receiving a latch 214 disposed on the bottom of the seat 218 is disposed on the rail 22. The latch 214 fastens to the striker 210 to secure the seating assembly 10 to the rail 22 when the seating assembly 10 is in the sitting position B.

Figure 8A:
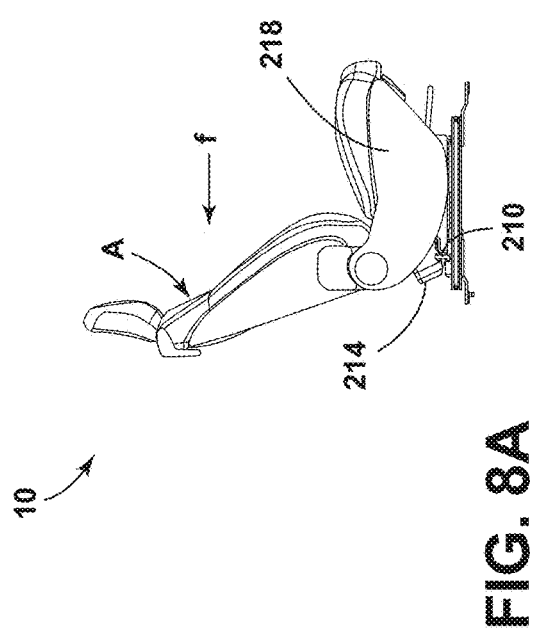
FIG. 8A is a right side elevational view of a seating assembly in a sitting position disposed at an intermediate location of a track assembly, according to an aspect of the disclosure.
Figure 8B:
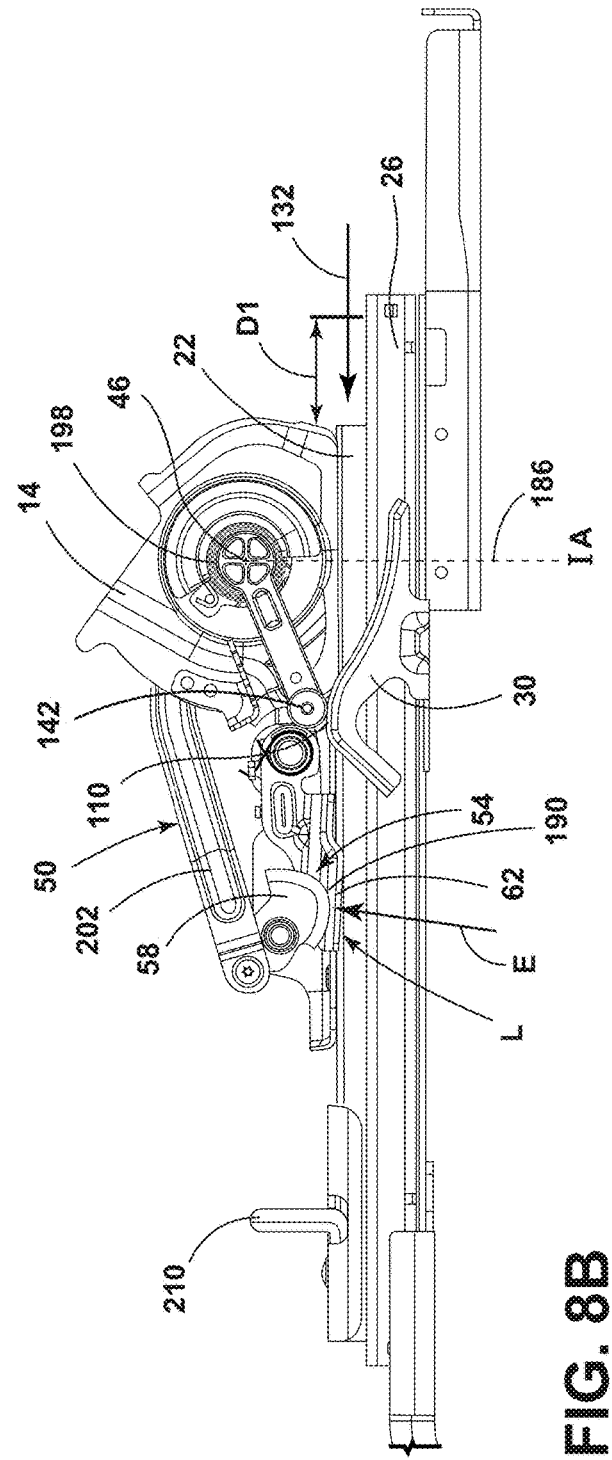
FIG. 8B is a right side elevational view of the track assembly, a positioning member, and a lever assembly disposed at an intermediate location of a track assembly, according to an aspect of the disclosure.

Referring now to FIGS. 8A and 8B, the seating assembly 10 is shown in an intermediate location IA along the track 26. In the example shown, the intermediate location IA is defined by the line 186 extending through the seat axis of rotation 46 and disposed transverse to the track 26. The intermediate location IA along the track 26 may be disposed between the first location I along the track 26 and the second location II along the track 26. Arrow 132 represents the direction in which the rail 22 moves along the track 26 from the intermediate location IA to the second location II. The roller 142 may be disposed at the apex 110 of the positioning bracket 30. The cam assembly 54 may be disposed in the locked position E with an eccentric profile 190 of the cam 58 exerting a downward pressure on the actuation plate 62 to place the cam 58 in the initial depressed position L, thereby substantially prohibiting the rail 22 from sliding along the track 26. The rail 22 may have moved a distance D1 along the track 26 between the first location I and the intermediate location IA.

Referring now to FIGS. 9A and 9B, the seating assembly 10 is shown in the second location II. Arrow 132 depicts the direction in which the rail 22 moves along the track 26. The seat axis of rotation 46 may be disposed at a second location II. The roller 142 may be disposed beyond the positioning bracket 30. The cam assembly 54 may be disposed in the locked position E with the eccentric profile 190 of the cam 58 exerting a downward pressure on the actuation plate 62 to maintain the cam 58 in the initial depressed position L, thereby substantially prohibiting the rail 22 from sliding in the track 26. The rail 22 may have moved a distance D2 along the track 26 from the intermediate location IA to the second location II.

Figure 10:
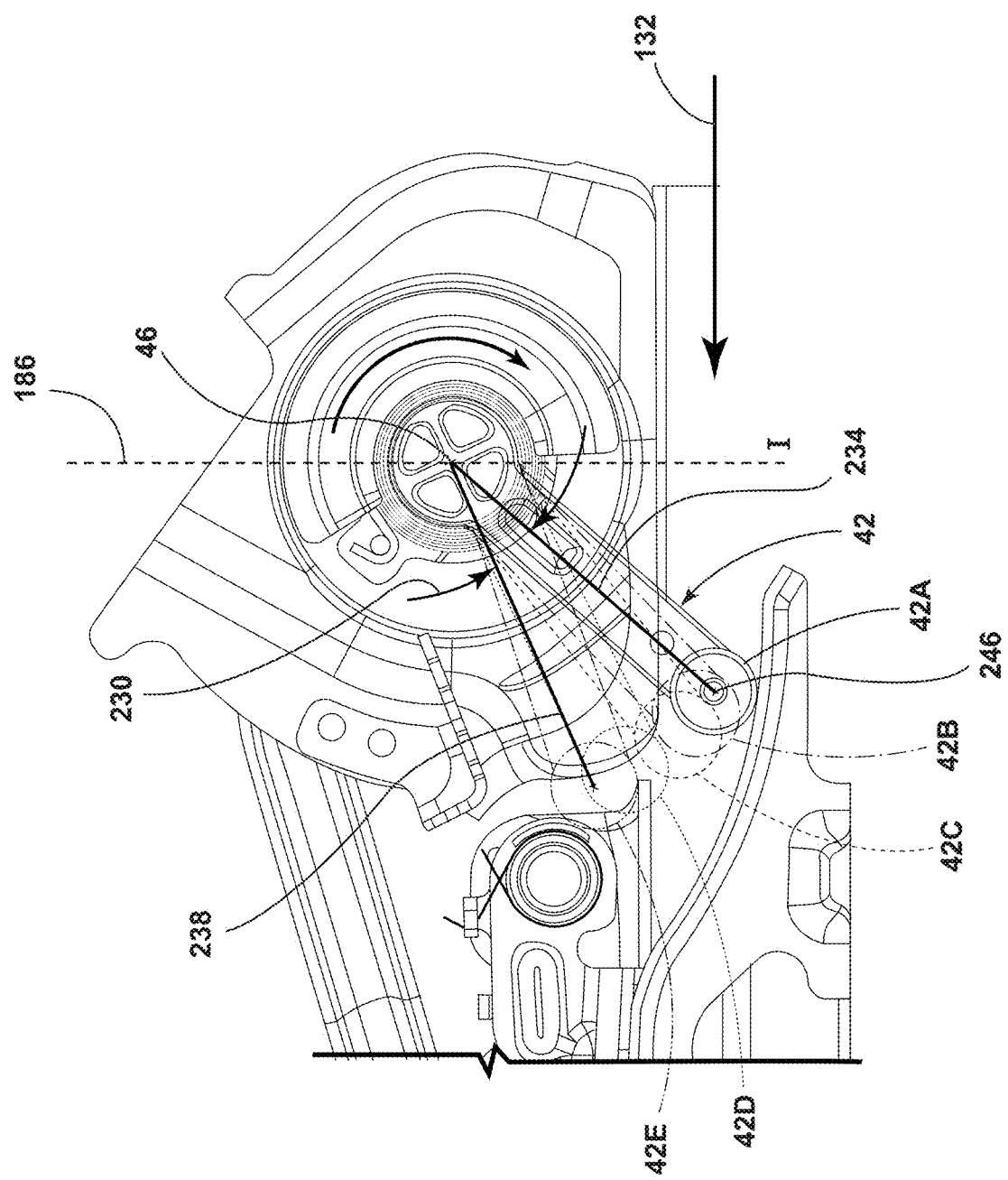
FIG. 10 is a right side elevational view of a lever assembly and a portion of the positioning member, according to an aspect of the disclosure.

Referring to FIG. 10, the rotational movement of the lever assembly 42 about the seat axis of rotation 46 is shown in a variety of positions. In the example shown, the predetermined angle 230 is approximately 26.0 degrees. The predetermined angle 230 may designate the amount of rotational movement about the seat axis of rotation 46 that the lever assembly 42 undergoes as the seating assembly 10 moves from a first position Ito an intermediate position IA. In the example shown, the displacement of the lever assembly 42 from the initial position (line 234) at which the lever assembly angle is approximately zero degrees to a predetermined angle 230 (line 238) at which the lever assembly angle is approximately 26 degrees may correlate to the position of the lever assembly 42 on the travel path 160 of the positioning bracket 30. The lever assembly 42 is shown in various orientations. The orientations of the lever assembly 42 may be identified as lever assembly orientations 42A, 42B, 42C, 42D, and 42E. The orientations 42A, 42B, 42C, 42D, and 42E may be defined by the angle between an initial position (line 234) and a line extending from the seat axis of rotation 46 to the roller axis of rotation 246 for each lever orientation (42A, 42B, 42C, 42D, and 42E). The varying amounts of force f needed to move the seating assembly 10 along the positioning bracket 30 may be plotted against the angles that define the orientations 42A, 42B, 42C, 42D, and 42E on the graph shown in FIG. 11. (FIGS. 7A and 8A.)

Figure 11:
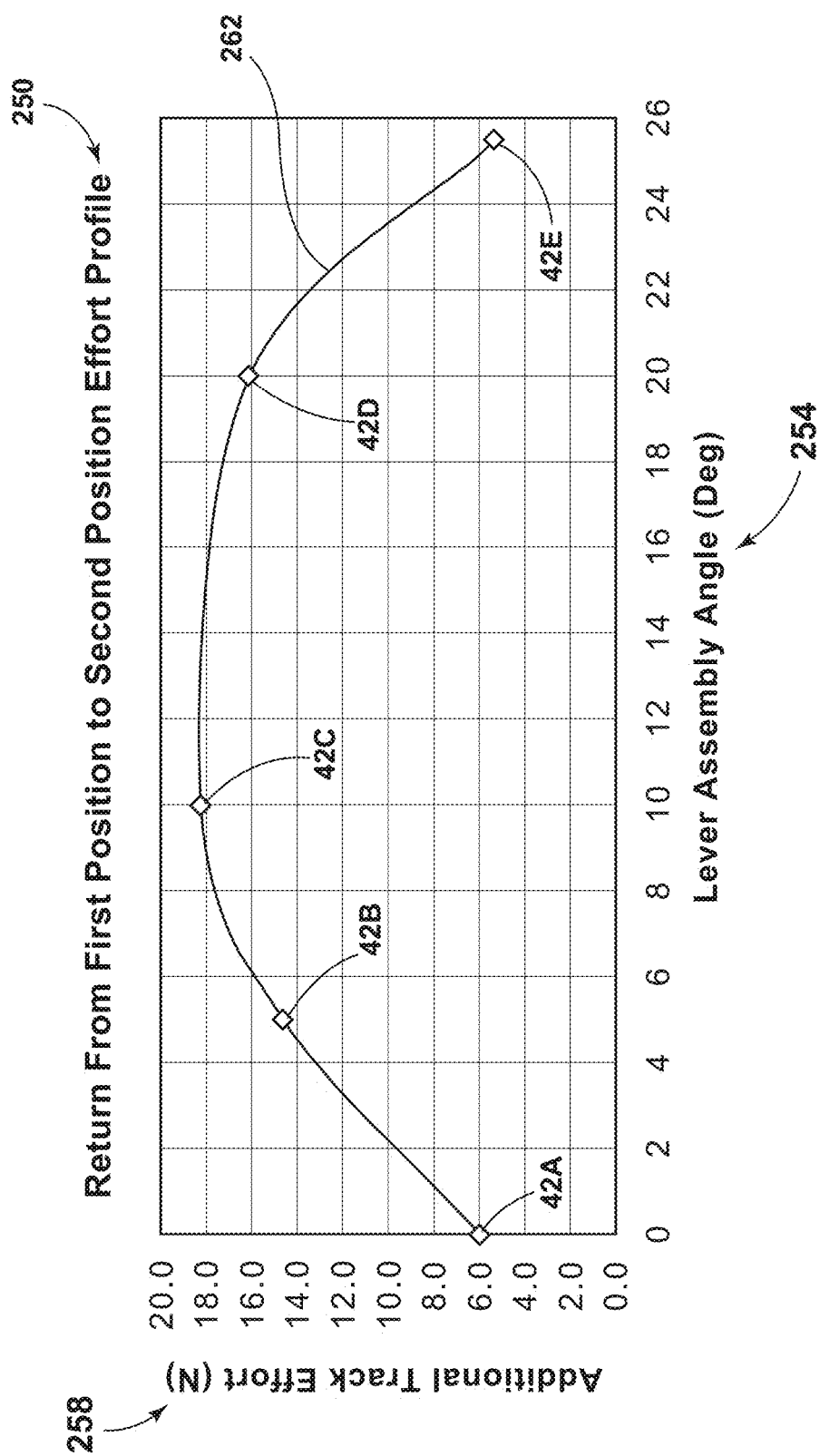
FIG. 11 is a graph of a lever assembly angle and a track effort, according to an aspect of the disclosure.

With reference to FIG. 11, results of measurements conducted on the seating assembly 10 as it slides along the track 26 and as the lever assembly 42 rotates around the seat axis of rotation 46 and along the travel path 160 on the positioning bracket 30 are shown. FIG. 11 is a graph having a title 250 "Return from First Position to Second Position Effort Profile." The designation 254 "Lever Assembly Angle (Deg)" is plotted on the X-axis. The term "Deg" refers to degrees. The degrees refer to the lever assembly angles shown in FIG. 10. The designation 258 "Additional Track Effort (N)" is plotted on the Y-axis. The term "N" refers to Newtons. As the roller 142 moves along the travel path 160 of the positioning bracket 30, the actuation force f exerted on the seating assembly 10 to move the seating assembly 10 from the first location I to the second location II may change. The change in actuation force f is encompassed by the Y-axis designation 258 "Additional Track Effort (N)." The curve 262 may contain data points 42A, 42B, 42C, 42D, and 42E corresponding to the lever assembly positions 42A, 42B, 42C, 42D, 42E shown in FIG. 10.

Accordingly, it is to be understood that the positioning bracket 30 and the lever assembly 42 may regulate the motion of the seating assembly 10 as it approaches the second location II along the track 26 in the direction shown by arrow 132 and as the seating assembly 10 moves from the standing position A to the sitting position B. Regulation of the force f needed to move the seating assembly 10 to the second location II may provide advantages to the occupant because the regulation may provide for generally smooth, substantially controlled movement of the seating assembly 10 into the second position II.

Figure 13:
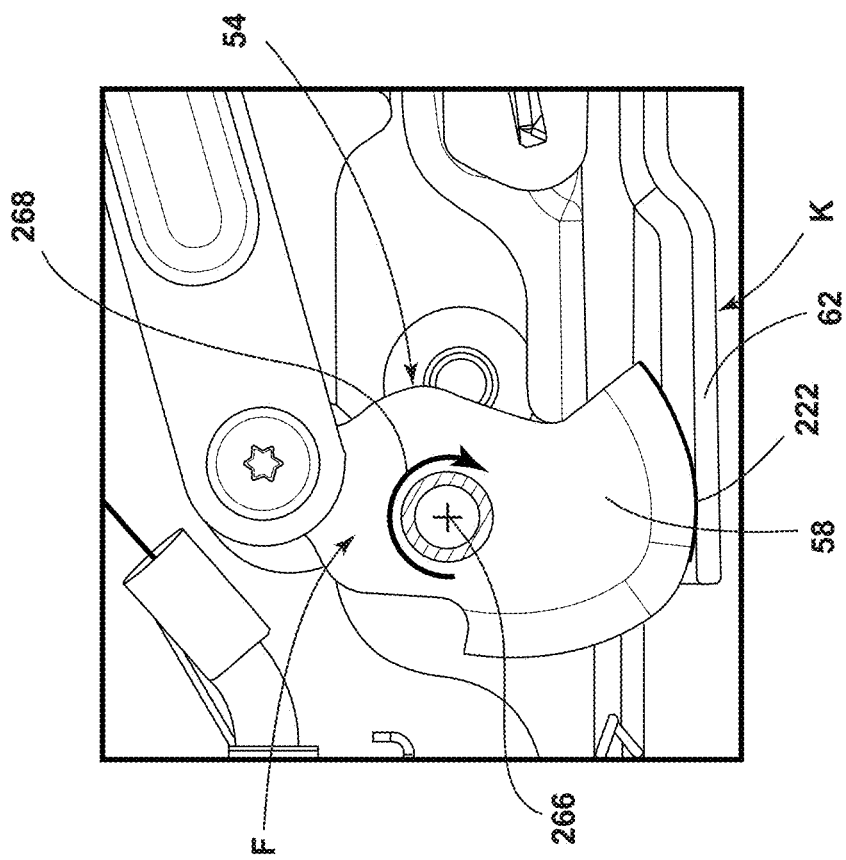
FIG. 13 is a right side elevational view of portions of a seating assembly frame showing the cam assembly in the unlocked position and the actuation plate in the final depressed position, according to an aspect of the disclosure.
Figure 12:
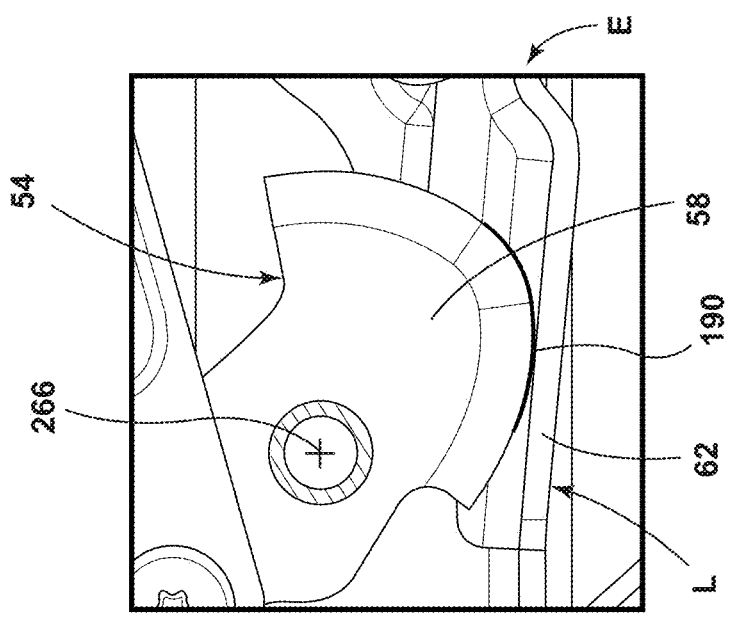
FIG. 12 is a right side elevational view of portions of a seating assembly frame showing the cam assembly in the locked position and the actuation plate in the initial depressed position, according to an aspect of the disclosure.

Referring now to FIGS. 12 and 13 the cam 58 may be in the locked position E (FIG. 12) or the unlocked position F (FIG. 13). In the locked position E, the eccentric profile 190 of the cam 58 may allow for quick displacement to depress the actuation plate 62 from the initial depressed position L (FIG. 12) to the final depressed position K (FIG. 13). In the locked position E of the cam assembly 54, the actuation plate 62 is in the initial depressed position L. In the unlocked position F of the cam assembly 54, the concentric profile 222 of the cam 58 may maintain the displacement of the actuation plate 62 from the initial depressed position L to the final depressed position K and may allow for the cam 58 to over travel so that the cam 58 may negligibly jam or negligibly bind the actuation plate 62 while continued rotation is applied about the cam axis of rotation 266 in the direction shown by arrow 268.

Referring to FIG. 14, the crank assembly 50 may be disposed between the cam assembly 54 and the seat axis of rotation 46. The crank assembly 50 may include the linkage 202 and the locking disk assembly 270. The locking disk assembly 270 may be rotatably coupled to the pivot bracket 14 at the seat axis of rotation 46.

With reference to FIGS. 1-14, a vehicle seating assembly 10 is movable between a sitting position B and a standing position A and pivotable about an axis of rotation (for example, seat axis of rotation 46) extending through a pivotable coupling 198 between lift mechanism 90 for moving the seating assembly 10 between a sitting position B and a standing position A and the seating assembly 10. The vehicle seating assembly 10 includes a track assembly 18 disposed on a vehicle floor 78. The track assembly 18 includes a stationary member (for example, track 26) and a movable member (for example, rail 22). The vehicle seating assembly 10 includes a positioning member (for example, positioning bracket 30) disposed adjacent to the track assembly 18 and proximate the vehicle floor 78. The vehicle seating assembly 10 includes a lever assembly 42 coupled to the lift mechanism 90, rotatable about the seat axis of rotation 46, and movable along the positioning member (for example, positioning bracket 30) as the movable member (for example, rail 22) moves relative to the stationary member (for example, track 26) from a first location Ito a second location II, wherein the movable member (for example, rail 22) is slidable along the stationary member (for example, track 26) in the first position I, and wherein the movable member (for example, rail 22) is fixed relative to the stationary member (for example, track 26) in the second position II.

Referring to FIGS. 1-14, a vehicle seating assembly 10 includes a seating assembly 10 slidable along a track 26 from a first location Ito a second location II. In the first location I, the seating assembly 10 is in a standing position A. In the second location II, the seating assembly 10 is in a sitting position B. A vehicle seating assembly 10 includes a positioning member (for example, positioning bracket 30) disposed adjacent to the track 26 and including a first sloped surface 34 and a second sloped surface 38. The vehicle seating assembly 10 includes a lever assembly 42 rotatably coupled to the seating assembly 10 and including an arm portion 150 movable along the first sloped surface 34 and the second sloped surface 38 as the seating assembly 10 moves from the first location I to a second location II.

A variety of advantages may be obtained by use of the present disclosure. The roller 142 may substantially smoothly move along the travel path 160 of the positioning bracket 30. The seating assembly 10 may substantially smoothly return from the first location I along the track 26 to the second location II along the track 26.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating assembly comprising:
    a track assembly disposed on a vehicle floor and including:
        a rail slidably disposed in a track; and
        a positioning bracket fixedly coupled to the track;
    a seat frame;
    a pivot bracket disposed at the front of the seat frame, coupled to the rail, and defining a seat axis of rotation disposed laterally along the seat frame;
    a lift mechanism coupled to the pivot bracket and configured to rotate the seat frame about the seat axis of rotation and between a sitting position and a standing position;
    a lever assembly rotatably coupled to the lift mechanism, rotatable about the seat axis of rotation, and movable along the positioning bracket as the rail slides in the track; and
    a release mechanism operably coupled to the lift mechanism and the track assembly and positionable in a locked position to fix the rail relative to the track or an unlocked position to release the rail from the track.

2. The vehicle seating assembly of claim 1, wherein the release mechanism includes a crank assembly rotatably coupled to the lift mechanism.

3. The vehicle seating assembly of claim 2, wherein the release mechanism includes a cam assembly rotatably coupled to the crank assembly.

4. The vehicle seating assembly of claim 3, wherein the cam assembly is positionable in a locked position to fix the rail to the track.

5. The vehicle seating assembly of claim 4, wherein the cam assembly is positionable in an unlocked position to release the rail from the track.

6. The vehicle seating assembly of claim 1, wherein the positioning bracket includes two sloped surfaces.

7. The vehicle seating assembly of claim 5, wherein the rail and the seat frame slide along a track from a first location along the track in which the seating assembly is in the standing position and the cam assembly is in the unlocked position to a second location along the track in which the seating assembly is in the sitting position and the cam assembly is in the locked position.

8. The vehicle seating assembly of claim 7, wherein an apex of the positioning bracket is disposed between the first location along the track and the second location along the track.

9. The vehicle seating assembly of claim 8, wherein the lever assembly includes a roller movable over the apex of the positioning bracket as the seat frame slides from the first location along the track to the second location along the track.

10. The vehicle seating assembly of claim 9, wherein the lever assembly rotates a predetermined angle about the seat axis of rotation as the roller moves from the first location along the track to the second location along the track.

11. The vehicle seating assembly of claim 10, wherein the predetermined angle is in an approximate range of approximately 13.0 degrees to approximately 52.0 degrees.

12. The vehicle seating assembly of claim 10, wherein the predetermined angle is approximately 26.0 degrees.

13. The vehicle seating assembly of claim 12, wherein the positioning bracket defines a travel path.

14. A vehicle seating assembly comprising:
    a seating assembly;
    a lift mechanism for moving the seating assembly between the sitting position and the standing position;
    a pivotable coupling between the lift mechanism and the seating assembly and including:
        a seat axis of rotation disposed through the pivotable coupling;
    a track assembly disposed on a vehicle floor and including:
        a stationary member; and
        a movable member;
    a positioning member disposed adjacent to the track assembly and proximate the vehicle floor; and
    a lever assembly coupled to the lift mechanism, rotatable about the seat axis of rotation, and movable from a first location to a second location as the movable member moves relative to the stationary member, wherein in the first location the movable member is slidable relative to the stationary member, and wherein in the second location the movable member is locked relative to the stationary member.

15. The vehicle seating assembly of claim 14, wherein the positioning member includes a bracket having an apex, wherein a distal end of the lever assembly is on a first side of the apex if the lever assembly is in the first location, wherein the distal end of the lever assembly is on a second side of the apex if the lever assembly is in the second location, and wherein the distal end of the lever assembly is on the apex if the lever assembly is in an intermediate location between the first location and the second location.

16. The vehicle seating assembly of claim 15, wherein the lever assembly includes a lever and a roller.

17. The vehicle seating assembly of claim 15, wherein the positioning member includes a positioning bracket having a base portion transverse to a guide portion.

18. The vehicle seating assembly of claim 17, wherein the base portion is disposed below the stationary member.

19. The vehicle seating assembly of claim 15, wherein an actuation force disposed on the seating assembly to move the seating assembly from the first location to the second location varies.

20. A vehicle seating assembly comprising:
    a seating assembly slidable along a track from a first location to a second location, wherein in the first location the seating assembly is in a standing position and wherein in the second location the seating assembly is in a sitting position;
    a positioning member disposed adjacent to the track and including:
        a first sloped surface; and
        a second sloped surface; and
    a lever assembly rotatably coupled to a lift mechanism, rotatable about a seat axis of rotation and including:

an arm portion movable along the first sloped surface and the second sloped surface as the seating assembly moves from the first location to the second location.

* * * * *